United States Patent
Oh et al.

(10) Patent No.: US 11,548,155 B2
(45) Date of Patent: Jan. 10, 2023

(54) INTERACTION TRAINING SYSTEM OF ROBOT WITH MR ENVIRONMENT

(71) Applicant: KOREA INSTITUTE OF ROBOT & CONVERGENCE, Pohang-si (KR)

(72) Inventors: Seung Sub Oh, Pohang-si (KR); Kyon Mo Yang, Pohang-si (KR); Kap Ho Seo, Pohang-si (KR); Dong Gi Gwak, Pohang-si (KR)

(73) Assignee: KOREA INSTITUTE OF ROBOT & CONVERGENCE, Pohang-si (KR)

( * ) Notice: Subject to any disclaimer, the term of this patent is extended or adjusted under 35 U.S.C. 154(b) by 311 days.

(21) Appl. No.: 17/006,908

(22) Filed: Aug. 31, 2020

(65) Prior Publication Data

US 2022/0063103 A1 Mar. 3, 2022

(51) Int. Cl.
 *B25J 9/16* (2006.01)
 *B25J 19/00* (2006.01)
 *G06T 19/00* (2011.01)
 *B25J 9/00* (2006.01)

(52) U.S. Cl.
 CPC ........... *B25J 9/1689* (2013.01); *B25J 9/0081* (2013.01); *B25J 9/1671* (2013.01); *G06T 19/006* (2013.01)

(58) Field of Classification Search
 CPC ...... B25J 9/1689; B25J 9/0081; B25J 9/1671; B25J 5/00; B25J 13/06; B25J 13/00; G06T 19/006; G05D 2201/0209; G05D 1/0016
 See application file for complete search history.

(56) References Cited

U.S. PATENT DOCUMENTS

| | | | | |
|---|---|---|---|---|
| 11,040,773 B2* | 6/2021 | Furukawa | ............ | B65H 75/425 |
| 11,410,416 B1* | 8/2022 | Khmelev | ............... | G06V 20/10 |
| 2018/0311815 A1* | 11/2018 | Shaw | ..................... | B25J 9/1671 |
| 2018/0356635 A1* | 12/2018 | Haley | .................. | G02B 27/017 |
| 2019/0176987 A1* | 6/2019 | Beecham | .............. | A62C 3/0242 |
| 2021/0116912 A1* | 4/2021 | Pikus | .................. | G05B 13/0265 |
| 2022/0040514 A1* | 2/2022 | Claesson | ................. | E01H 15/00 |

* cited by examiner

*Primary Examiner* — Kira Nguyen
(74) *Attorney, Agent, or Firm* — Patent Office of Dr. Chung Park

(57) ABSTRACT

The present invention relates to an interaction training system of a robot with a Mixed Reality (MR) environment, and to a training system in which a robot including a camera and a sensor is driven in a training space and a virtual environment like an actual environment is provided to a trainee to train the trainee.

9 Claims, 9 Drawing Sheets

INTERACTION TRAINING SYSTEM OF ROBOT WITH MR ENVIRONMENT

TECHNICAL FIELD

The present invention relates to establish a disaster scenario of a Mixed Reality (MR) environment to enable a trainee to drive a robot, and more particularly, to an interaction training system of a robot with an MR environment, which establishes an environment in which a trainee operates a robot with an MR environment and copes with various events to achieve a training goal.

BACKGROUND ART

The era of the fourth industrial revolution demands a rapid pace of change in the modern society that pursues technological innovation, and a robot and artificial intelligence have become one of the fields of interest in the modern society.

The robot has been developed for the purpose of replacing many of the tasks of humans, and in the near future, the robot is expected to take the place of saving lives and repairing collapsed facilities in disaster sites.

Disasters, such as fire, flood, and landslide, require very important measures and situation determination moment by moment.

In the disaster situation, ground driving robots, flying robots, such as drones, or various types of robots are developed and driven according to need, and a controller operating the disaster response robot remotely controls one or several robots at the same time.

In the event of a disaster, the ability to appropriately control the disaster response robot and a disaster coping ability of the controller are required.

An existing evaluation system for training and evaluating a disaster coping ability of a controller is mainly limited to training and evaluating an operation ability of a controller in a virtual environment.

There is a need for a system for training or evaluating an ability to operate an actual robot, give a well-timed command, and cope with various disaster situations.

In the system for training and evaluating the controller for the disaster situation, the key factor is to make the trainee actually operating a robot feel a virtual environment the same as the actual environment, but there is no system for controlling the robot so that the robot in the actual environment recognizes a disaster task in the virtual environment, so that there is a limitation in the virtual environment.

For example, in an actual virtual simulation training system called Live-Virtual Constructive (LVC), the training on tactics and the recognition of virtual enemies are the main points, so that an environment in which the actually operated robot is in contact with a virtual medium is not made, which is different from a disaster environment, and many other training systems having virtual simulation training systems do not actually use robots, so that there is a problem in that trainees feel different in the actual situation.

SUMMARY OF THE INVENTION

The present invention is conceived to solve the problems in the related art, and has been made in an effort to provide a system for training a trainee through a robot so as to respond to a disaster in a Mixed Reality (MR) environment.

Particularly, the present invention has also been made in an effort to provide a system for training which enables a trainee to visually check a virtual training event, and the degrees of damage to the robot that is in contact with the virtual training event and the virtual training event so as for the robot in an actual environment to recognize and for the trainee to feel a disaster task in a virtual environment, so the trainee preferably operates the robot in the disaster situation through the training of coping with an accident in a scenario.

The technical objects of the present disclosure are not limited to the foregoing technical objects, and other non-mentioned technical objects will be clearly understood by those skilled in the art from the description below.

An exemplary embodiment of the present invention provides an interaction training system of a robot with a Mixed Reality (MR) environment, in which a trainee is trained to respond to a disaster task by operating a robot in a situation where a disaster occurs, the interaction training system including: a scenario module which establishes a scenario so that the trainee sets an environmental element incurable during the performance of the disaster task as a training event by operating the robot by the robot, and performs the disaster task by driving the robot and is trained in response to the training event; an MR environment implementing module which virtually or actually implements the disaster task in the scenario; an interaction module which determines whether the training event in the scenario is actual or virtual, and restricts the driving of the robot by the virtual training event before a command operating the robot by the trainee when the virtual training event is generated while the trainee operates the robot in order to perform the disaster task to make the trainee recognize the virtual training event; a robot driving module which priorities a command restricting the driving of the robot over the command operating the robot by the trainee and transmits the command restricting the driving of the robot to the robot when the driving of the robot is restricted by the interaction module; and a control module which provides the trainee with a result of the driving of the robot by the command of the trainee during the performance of the disaster task and a result of the driving of the robot restricted by the interaction module, in which the interaction module provides the control module with a change of the robot and a change of the virtual training event for the result of the driving of the robot restricted in the virtual training event.

The interaction module may include: an interaction determination unit which determines whether the training event in the scenario is an actual training event or a virtual training event, and determines whether the result obtained by commanding and driving the robot by the trainee matches the result obtained by commanding the robot so as to respond to the virtual training event when the training event in the scenario is the virtual training event; an interaction control unit which receives the result of the determination from the interaction determination unit, and provides the robot driving module with the command restricting the driving of the robot when the trainee fails to operate the robot to respond to the virtual training event; and an interaction effect unit which provides the control module with a state of the robot of which the driving is restricted by the virtual training event through the interaction control unit and a signal stimulating a sense of the trainee, and makes the trainee recognize the change of the robot and the change of the virtual training event for the result of the restriction of the driving of the robot.

When the interaction determining unit of the interaction module may determine that the training event is the actual training event, the interaction control unit may not involve the driving of the robot.

The interaction control unit may extract the training event information from the scenario module and generates a control command that is a command for restricting the driving of the robot in response to a size and a position of the virtual training event.

The interaction effect unit may analyze the command operating the robot by the trainee, and express a transformed state of the robot and a transformed state of the virtual training event in the MR environment according to a speed of the root and the number of times of a contact and a collision of the robot with the virtual training event.

The robot may include a robot action unit which physically changes a state of the robot so as for the trainee to recognize a result corresponding to the virtual training event.

The robot may be coupled with wheels and be movably provided, and the robot action unit may be mounted to the wheel of the robot and block driving force rotating the wheels by the control command.

The interaction training system may further include a training evaluation module which evaluates a result of the operation of the robot obtained while the trainee responds to the disaster task and the training event by driving the robot.

The training evaluation module may compare travelling information of the robot, position information of the robot, and time information on time at which the robot passes through the scenario in the scenario with prestored scenario success data and draw a result.

The interaction training system of the robot with the MR environment of the present invention enables a trainee to recognize a virtual training event by controlling the robot to create an item with which the trainee is trained through the virtual training event, thereby maximizing a training effect even though an actual training event is not prepared.

The present invention exhibits a visual effect for a phenomenon in which the robot is in contact with a virtual training event and the driving of the robot, thereby providing a more realistic training effect like the training in an actual environment.

The effects of the present invention are not limited to the foregoing effects, and other non-mentioned effects will be clearly understood by those skilled in the art from the description below.

DETAILED DESCRIPTION

Figure 1:
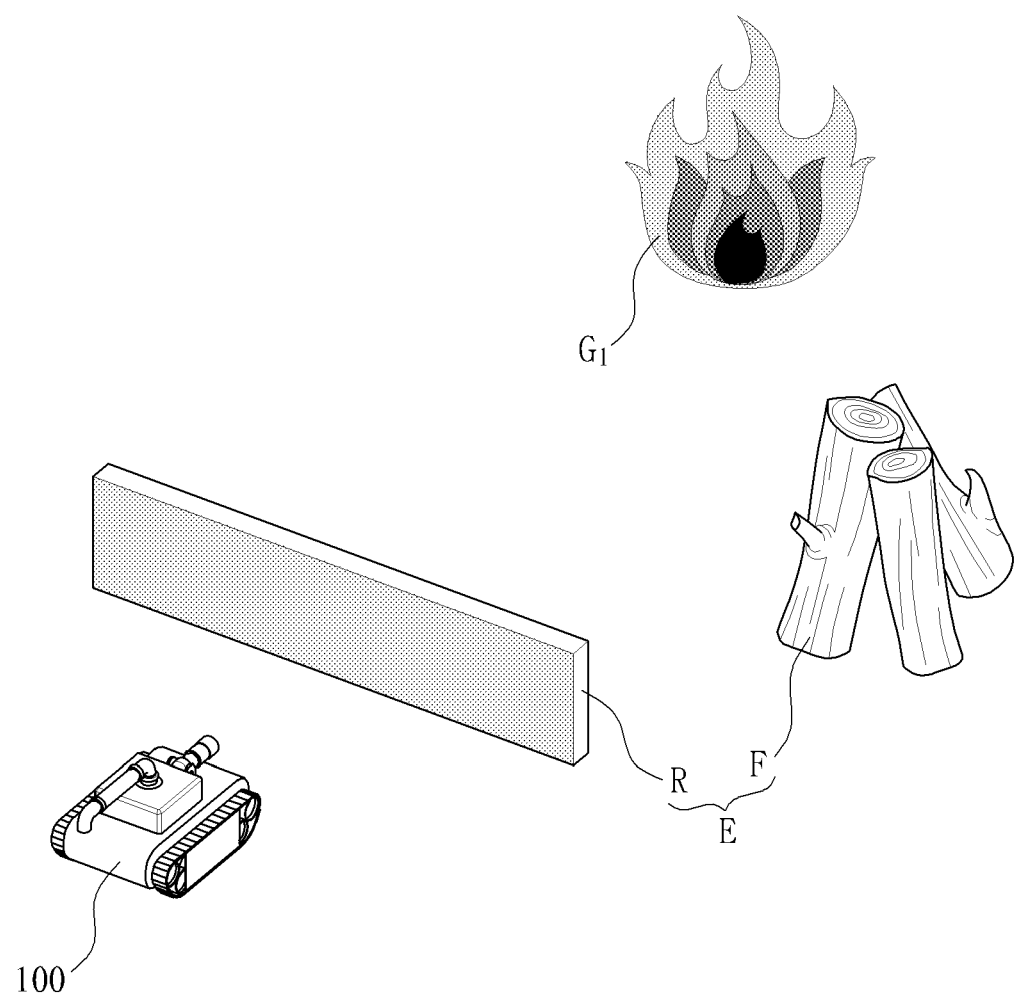
FIG. 1 is a diagram illustrating a disaster scenario displayed to a trainee in a robot training system in an interaction training system of a robot with a Mixed Reality (MR) environment according to an exemplary embodiment of the present invention.

Hereinafter, an exemplary embodiment of the present invention will be described in detail with reference to the accompanying drawings in detail so that those skilled in the art can easily implement the present invention.

In describing the exemplary embodiment, the description of technical contents, which are well known in the technical field to which the present invention belongs and are not directly related with the present invention, will be omitted. This is for the purpose of more clearly conveying the gist of the present invention without obscuring the gist of the present invention by omitting unnecessary description.

For the same reason, some elements in the accompanying drawings are exaggerated, omitted, or schematically illustrated. Further, a size of each component does not fully reflect an actual size. In each drawing, the same reference numerals are assigned to the same or corresponding constituent elements.

The present invention will be described in detail with reference to the drawings.

Figure 2:
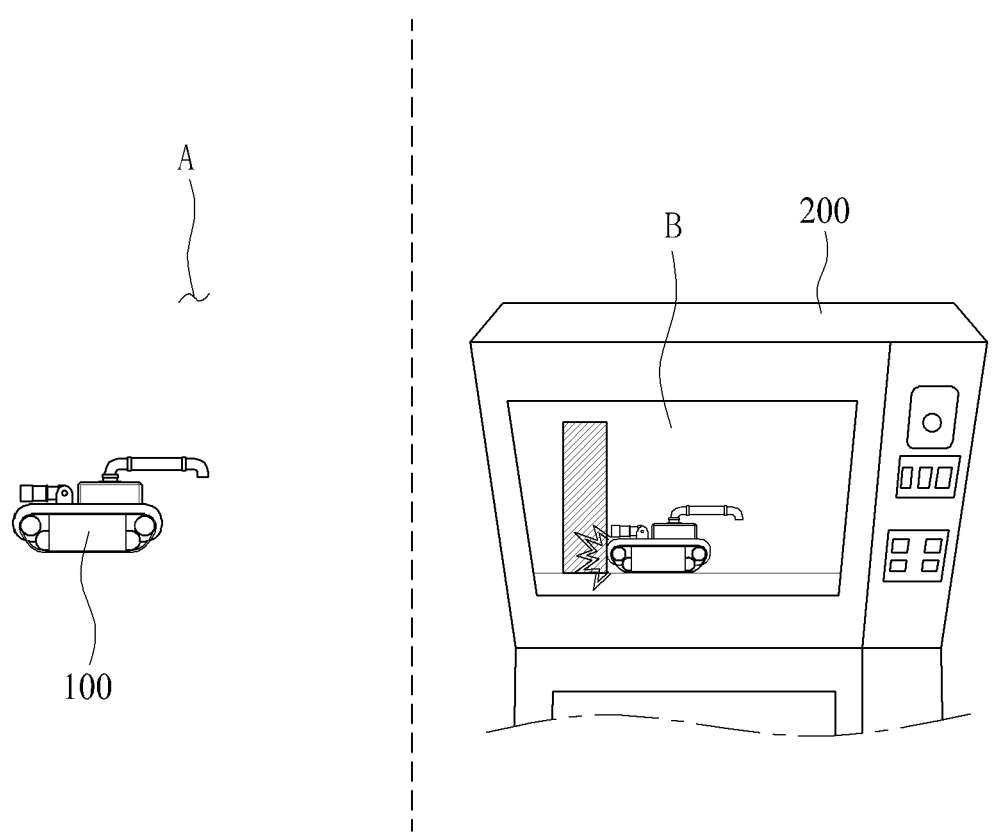
FIG. 2 is a diagram illustrating a robot in an actual training space and a robot according to a scenario displayed to a trainee in an interaction training system of a robot with an MR environment according to an exemplary embodiment of the present invention.
Figure 3:
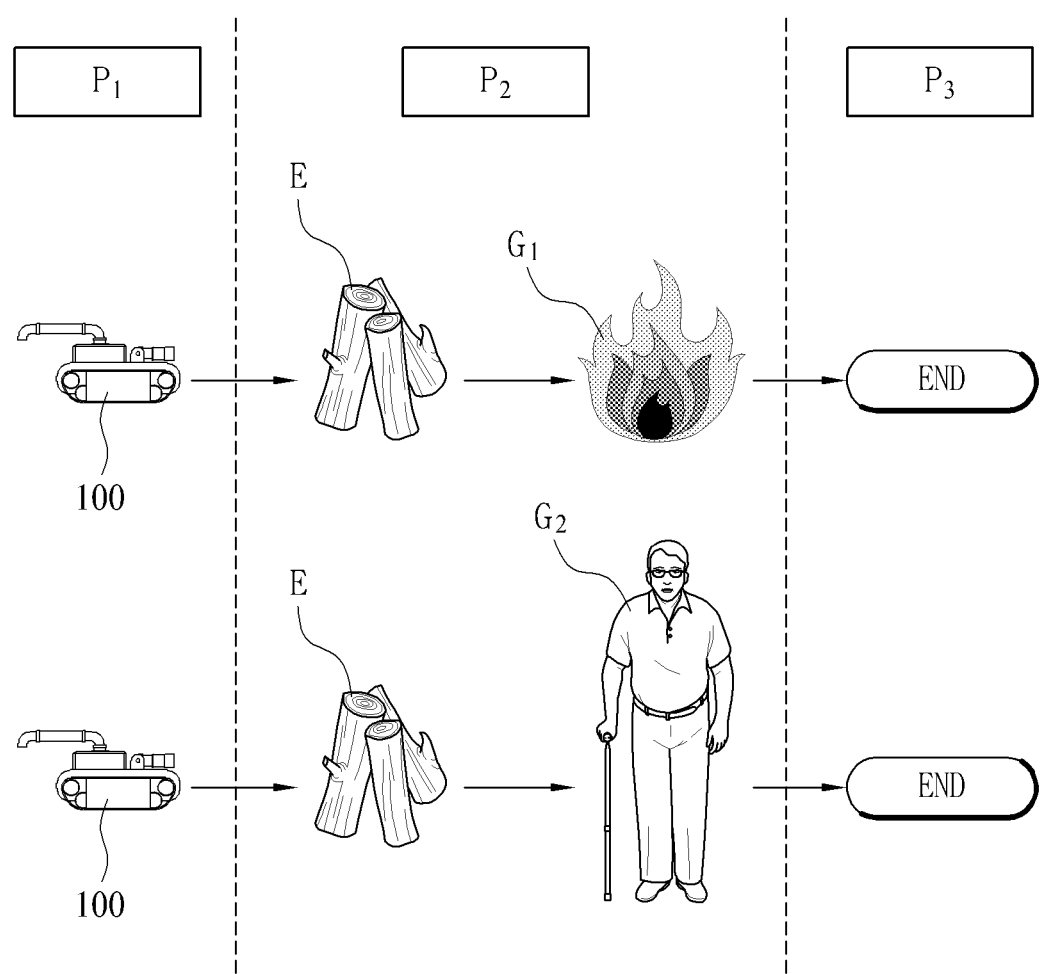
FIG. 3 is a diagram conceptually illustrating a fire suppression scenario and a requestor rescue scenario in the interaction training system of the robot with the MR environment according to the exemplary embodiment of the present invention.
Figure 4:
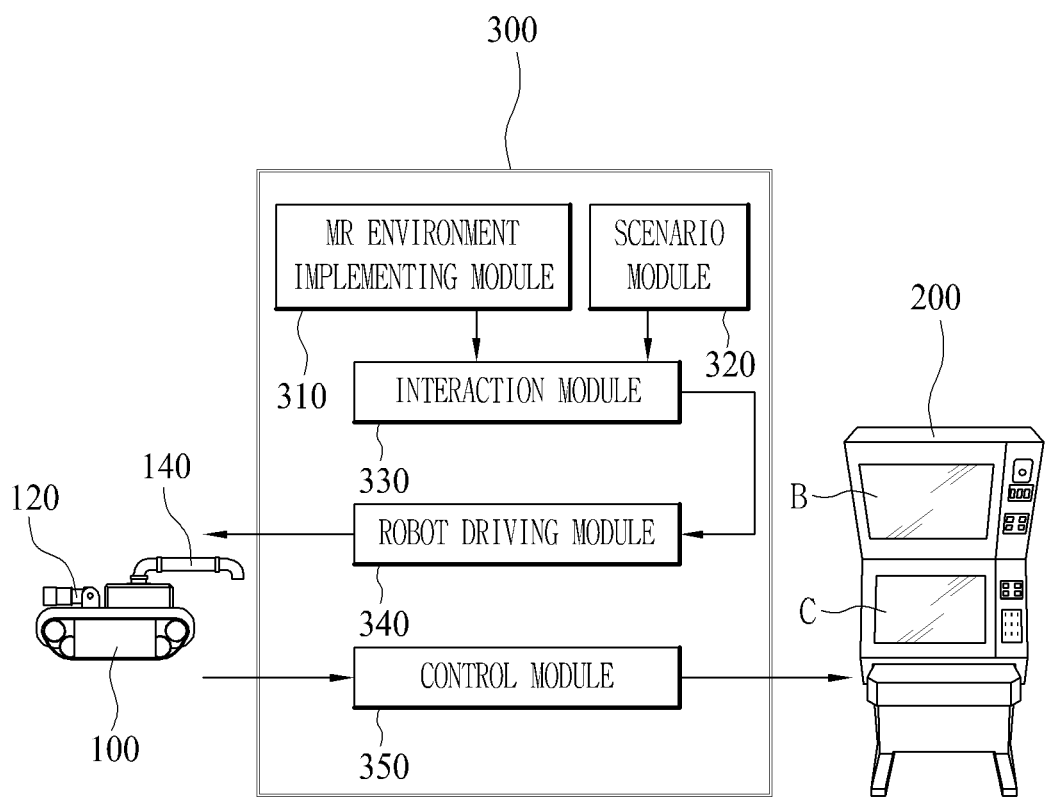
FIG. 4 is a diagram illustrating an overall concept for establishing a mixed reality environment in the interaction training system of the robot with the MR environment according to the exemplary embodiment of the present invention.
Figure 5:
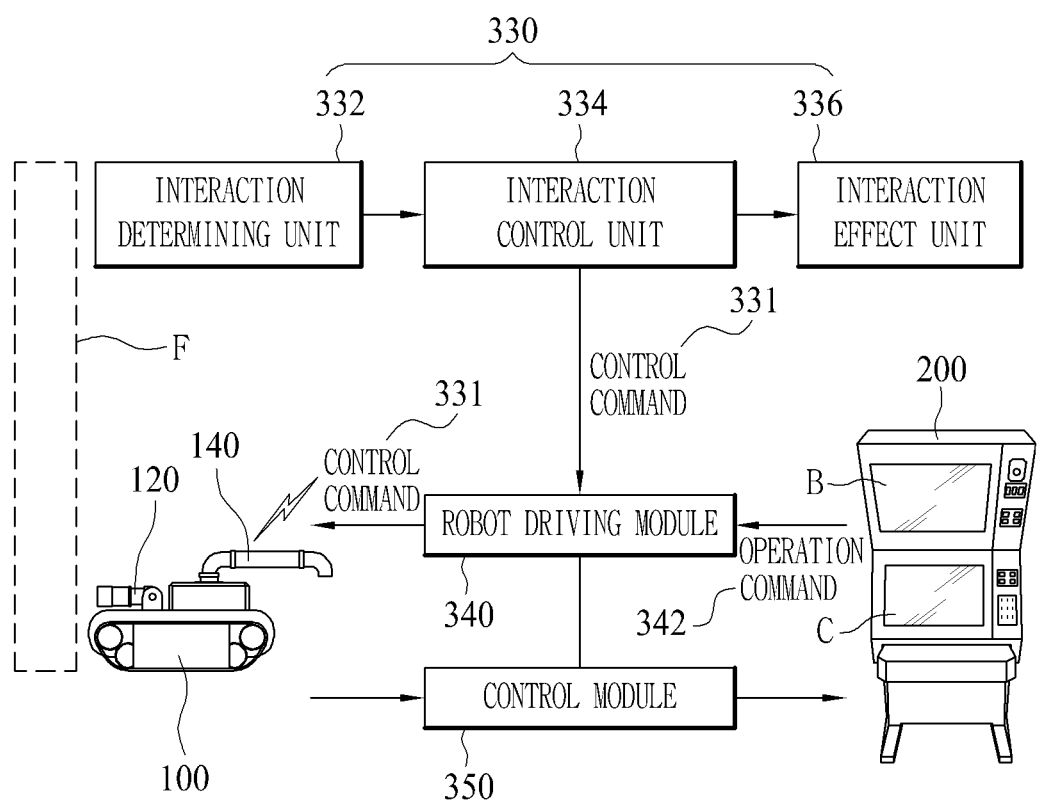
FIG. 5 is a signal flow diagram between the system, a trainee, and a robot so as to recognize a virtual training event in the interaction training system of the robot with the MR environment according to the exemplary embodiment of the present invention
Figure 6:
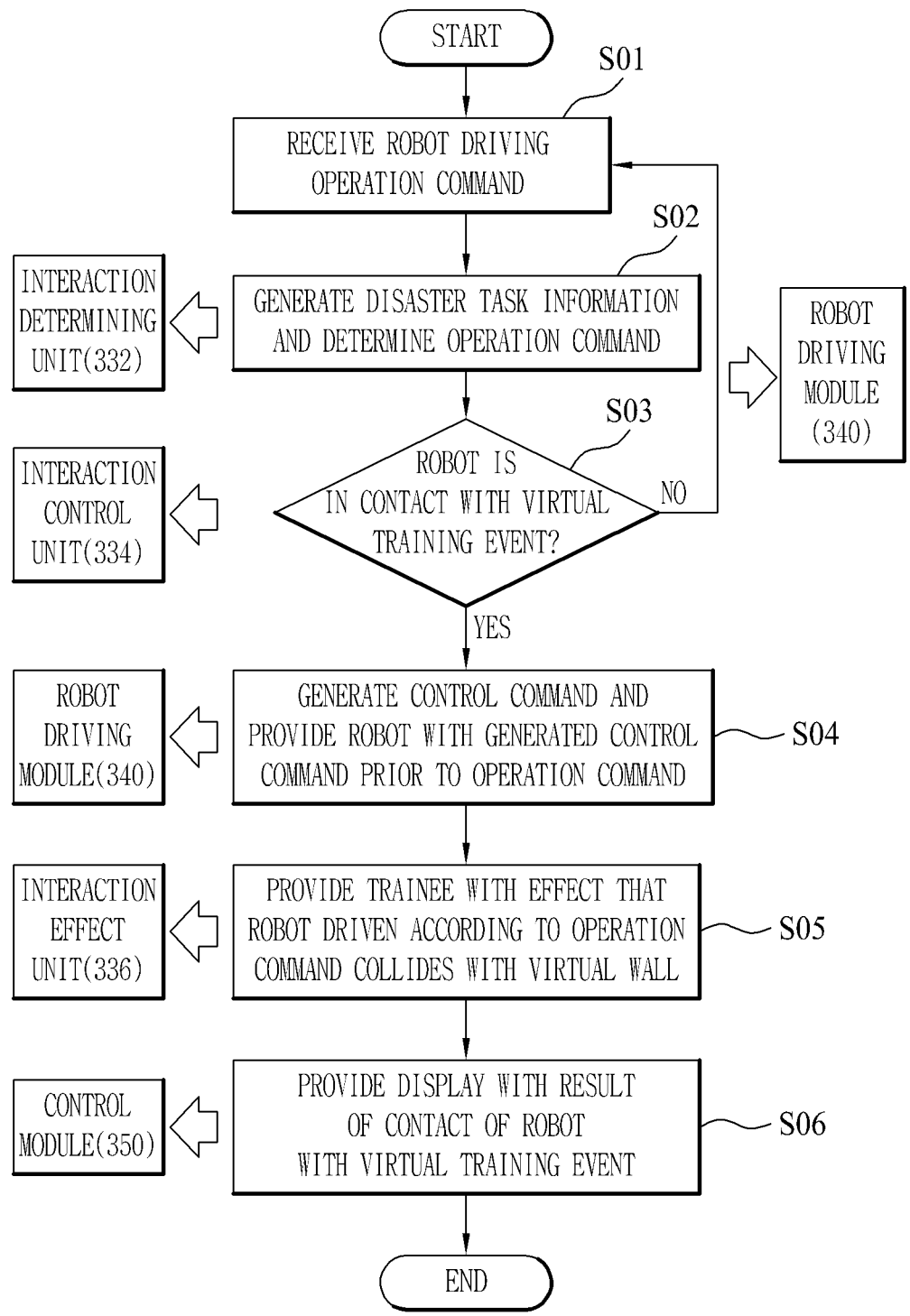
FIG. 6 is a diagram illustrating an algorithm in which a robot recognizes a virtual training event in the interaction training system of the robot with the MR environment according to the exemplary embodiment of the present invention.
Figure 7:
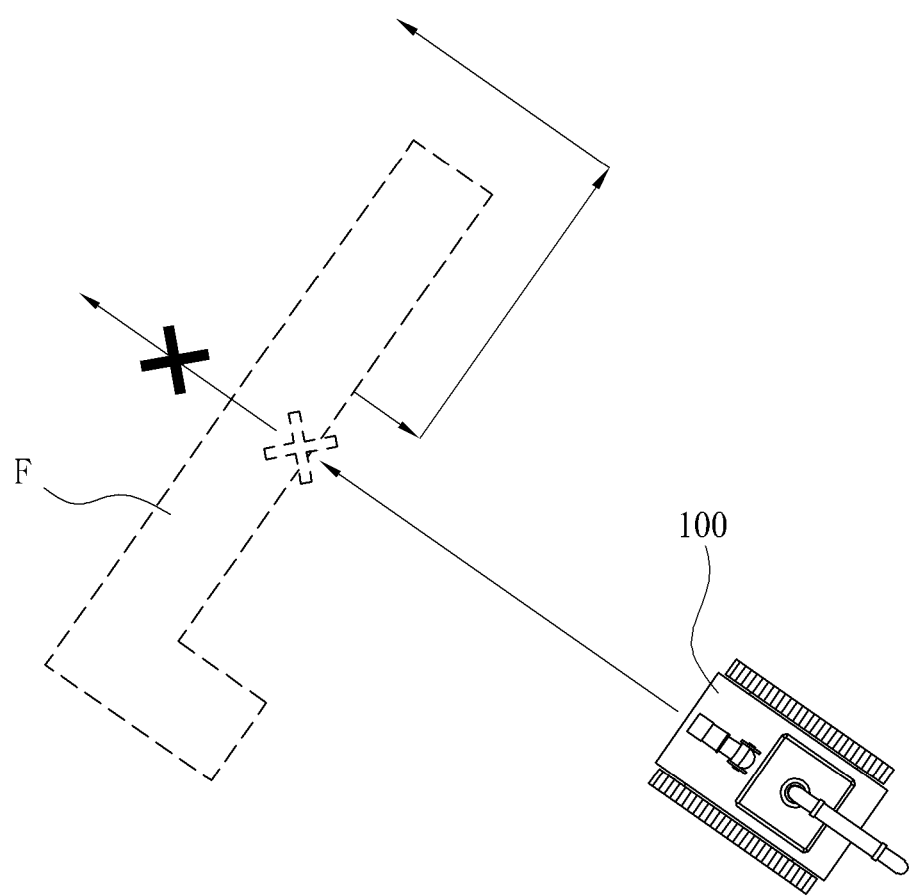
FIG. 7 is a conceptual diagram illustrating robot driving for a virtual training event in the interaction training system of the robot with the MR environment according to the exemplary embodiment of the present invention.
Figure 8:
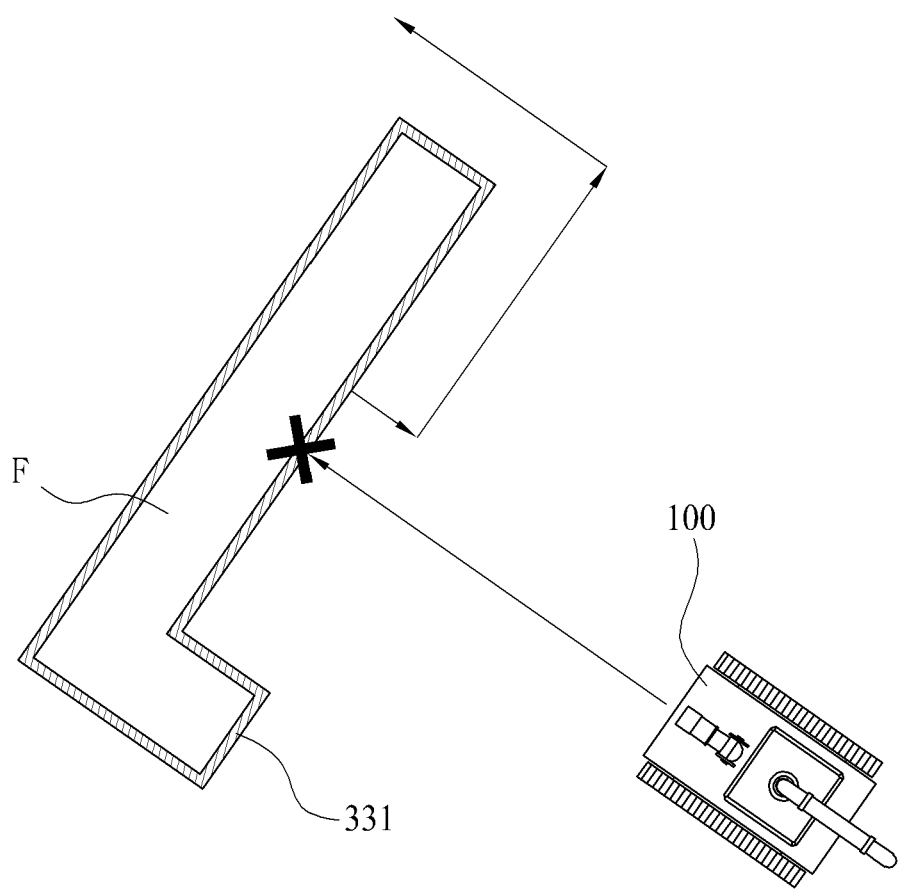
FIG. 8 is a conceptual diagram illustrating a situation where a robot is capable of recognizing a virtual training event by a control command in the interaction training system of the robot with the MR environment according to the exemplary embodiment of the present invention.
Figure 9:
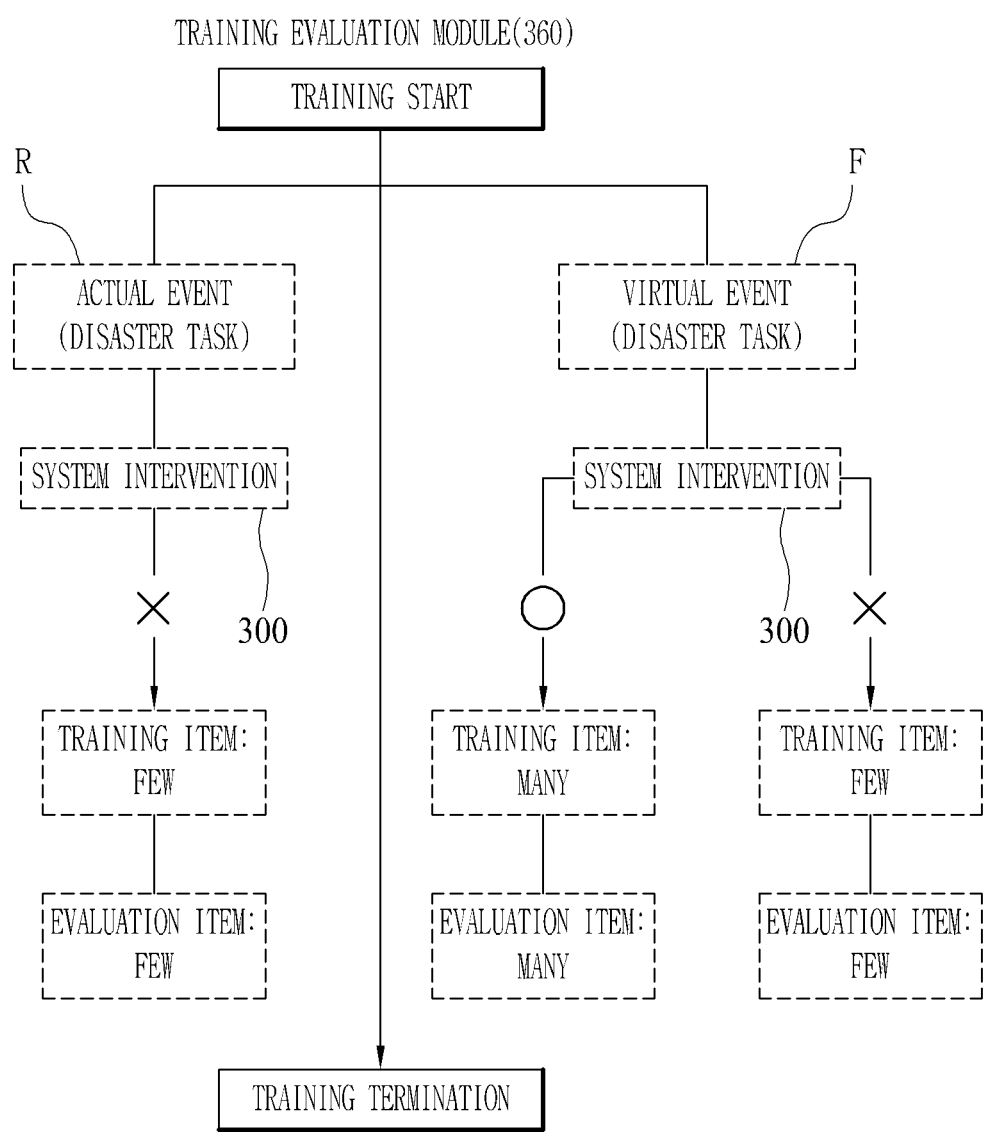
FIG. 9 is a diagram illustrating the degree of training of a trainee according to whether the disaster task is virtual or actual through a training evaluation module in the interaction training system of the robot with the MR environment according to the exemplary embodiment of the present invention.

FIG. 1 is a diagram illustrating a disaster scenario displayed to a trainee in an interaction training system 300 of a robot 100 with a Mixed Reality (MR) environment according to an exemplary embodiment of the present invention, FIG. 2 is a diagram illustrating the robot 100 in an actual training space A and the robot 100 in a scenario displayed to a trainee in the interaction training system 300 of the robot 100 with the MR environment according to the exemplary embodiment of the present invention, FIG. 3 is a diagram conceptually illustrating a fire G1 suppression scenario and a requestor G2 rescue scenario in the interaction training system 300 of the robot 100 with the MR environment according to the exemplary embodiment of the present invention, FIG. 4 is a diagram illustrating an overall concept for establishing a mixed reality environment in the interaction training system 300 of the robot 100 with the MR environment according to the exemplary embodiment of the present invention, FIG. 5 is a signal flow diagram between the system 300, a trainee, and the robot 100 so as to recognize a virtual training event F in the interaction training system 300 of the robot 100 with the MR environment according to the exemplary embodiment of the present invention, FIG. 6 is a diagram illustrating an algorithm in which the robot 100 recognizes the virtual training event F in the interaction training system 300 of the robot with the MR environment according to the exemplary embodiment of the present invention, FIG. 7 is a conceptual diagram illustrating driving the robot 100 for the virtual training event F in the interaction training system 300 of the robot 100 with the MR environment according to the exemplary embodiment of the present invention, FIG. 8 is a conceptual diagram illustrating a situation where the robot 100 is capable of recognizing the virtual training event F by a control command 331 in the interaction training system 300 of the robot 100 with the MR environment according to the exemplary embodiment of the present invention, and FIG. 9 is a diagram illustrating a training level of a trainee according to whether a disaster task E is virtual or actual through a training evaluation module in the interaction training system 300 of the robot 100 with the MR environment according to the exemplary embodiment of the present invention.

The present invention relates to an interaction training system 300 of a robot 100 with a Mixed Reality (MR) environment in which a disaster situation like an actual situation is implemented in a MR environment and a trainee operating the actual robot 100 is trained in a virtual disaster situation, and the system 300 may include an MR environment implementing module 310, a scenario module 320, an interaction module 330, a robot driving module 340, and a control module 350.

The system 300 may be stored in the robot 100, or may be stored in a controller 200 through which the trainee operates the robot 100.

First, the robot 100 according to the exemplary embodiment of the present invention may have a body, a moving part, and a camera 120, and a communication arm 140, which is capable of communicating with a virtual environment, may be included in a part of the body.

The various sensors are mounted inside the robot 100 to generate information about the robot 100.

The sensors provided in the robot 100 may include a position sensor, a communication sensor, a speed (including acceleration) sensor, and a photo sensor.

It is assumed that the robot 100 moves in the training space A that is an actual environment of the present invention, and a marker is formed on a ceiling and a wall in an actual space, and the robot 100 may transmit position information through the marker, and an image photographed by the robot 100 may also be transmitted in real time.

The sensor data and the image data may be transmitted to the system 300 in real time, and the trainee may drive the robot 100 through the controller 200 which is capable of driving the robot 100 in the training space A.

The controller 200 provides the robot 100 with an operation command 342 so that the trainee is capable of remotely operating the robot 100 in a space separate from the training space A.

The controller 200 is formed with a joystick and a button, and may be displayed with the MR environment so that virtual target objects G1 and G2 and the virtual training event F are generated at specific positions in the image data.

The controller 200 may be formed with a display so as for the trainee to view the MR environment.

Accordingly, the trainee may be trained in the form of driving the actual robot 100 in the training space A while viewing the MR environment, such as the disaster environment, through the controller 200.

In the meantime, the creation of the MR environment through the image data may be performed in the MR environment implementing module 310.

The scenario module 320 is connected with the MR environment implementing module 310, and may recognize a structure of the training space A and generate a scenario including target positions at which the disaster task E and the virtual target objects G1 and G2 corresponding to the scenario achievement target are disposed between a start position P1 and an end position P3.

The scenario module 320 may communicate with the virtual target objects G1 and G2 through the communication arm 140 mounted to the robot 100 to suppress fire G1.

The interaction module 330 may generate size and position information about the virtual target objects G1 and G2, as well as the virtual training event F.

In particular, the interaction determining unit 332 may determine whether the robot 100 is adjacent to the virtual target objects G1 and G2 with the information about the virtual target objects G1 and G2 disposed at the target positions, and the interaction control unit 334 may make the virtual target objects G1 and G2 disappear in the scenario through a direction and a time of the signal generated in the communication arm 140 in response to the information about the virtual target objects G1 and G2.

The scenario may be implemented in the form of the MR environment.

Accordingly, the trainee may progress the scenario while viewing the image implemented in the MR environment through the controller 200, and in this case, the robot 100 may be driven by receiving the operation command 342 of the trainee in the MR environment.

In the meantime, the interaction module 330 checks the disaster task E generated in the MR environment, determines whether the robot 100 arrives at a contact point at which the robot 100 is in contact with the disaster task E by the operation command 342, and generates a control command 331 controlling the robot 100 at the contact point.

In particular, the interaction module 330 may generate the control command 331 controlling the driving of the robot 100 at the contact position prior to the operation command 342 so that the robot 100 reacts as if there is the virtual training event F at the contact point at which the virtual training event F is positioned while the trainee drives the robot 100 through the operation command 342.

Through this, the trainee may check on the display as if the robot 100 moves and collides with the wall that is the virtual training event F.

Herein, the robot driving module 340 may provide the robot 100 with the operation command 342 and the control command 331.

The robot driving module 340 may provide the robot 100 with the control command 331 at the contact point at which the robot 100 is in contact with the virtual training event F as if the robot 100 collides with the disaster task E.

In this case, the scenario of the MR environment has been provided to the display of the trainee, so that the trainee may see as if the robot 100 actually collides with the wall.

The system may include the control module 350 which is connected with the robot driving module 340, which selects the operation command 342 and the control command 331 and provides the robot 100 with the selected commands, and provides the trainee with the driving result of the robot 100 in the scenario so as for the trainee to check the result.

The control module 350 may provide the state where the robot driving module 340 provides the robot 100 with the operation command 342 and the control command 331 and the trainee is capable of providing the robot 100 with the operation command 342 in the state where the robot 100 is in contact with the disaster task E or is in contact with the disaster task E and then is separated from the disaster task E.

That is, the robot 100 provides the trainee with operation timing so that the trainee is capable of recognizing the collision with the virtual training event F.

The implementation of the exemplary embodiment of the present invention will be described in detail with reference to the drawings.

In FIGS. 1 and 2, in describing the present invention, a fire situation is set as disaster as an example.

As illustrated, the disaster task E may be disposed while the robot moves to the target position P2 at which fire G1 occurs, and the disaster task E may be the type, such as a wall, wood, and fire wreckage.

The virtual target objects G1 and G2 are set as the fire G1 in the fire G1 scenario.

In the scenario, the robot 100 needs to move from the start position P1 to the target positions at which the virtual target objects G1 and G2 are formed and suppress the fire G1. The disaster task E may be formed between the start position P1 and the target position.

The disaster task E may be the actual disaster task E formed in the training space A corresponding to the wall, and may also be the virtual training event F that is not present in the training space A.

The trainee moves to the target position while avoiding the disaster task E in order to achieve the scenario target, and performs the training of suppressing the fire G1.

The fire G1 scenario may also provide a scenario of rescuing a requestor G2, as well as the training of suppressing the fire G1, as illustrated in FIG. 2.

The scenario is not limited to the fire G1 and the rescue of the requestor G2, and the scenario module 320 may provide a scenario including the fire G1, tornado, rescue, flood, and the like according to a disaster situation, and the virtual target objects G1 and G2 according to the provided scenario may be variously provided through the establishment of the scenario.

The present exemplary embodiment will be described based on the selection of the fire G1 scenario.

In FIG. 3, the scenario module 320 includes a scenario which is divided into the start position P1 at which the scenario starts and the end position P3, and includes the target positions at which fire G1 or the requestor G2 corresponding to the scenario targets are formed between the start position P1 and the end position P3 as the virtual target objects G1 and G2.

The scenario module 320 may adjust the disposition of the start position P1, the target position, the end position P3, and the disaster task E based on the actual information on the training space A.

In this case, the scenario module 320 may provide the trainee with the scenario in the MR environment together with the MR environment implementing module 310.

The system 300 of the present invention having the foregoing configuration may provide the trainee with the rescue training, so that the trainee may achieve a training effect corresponding to an actual disaster environment in the MR environment.

The object of the present invention is to enable the trainee to experience the virtual target objects G1 and G2 virtually implemented in the MR environment, which will be described in detail with reference to FIGS. 4 and 5.

In FIG. 4, the trainee driving the robot 100 through the controller 200 may feel the environment like a real through the driving control of the robot 100 and the implementation of the MR environment by the intervention of the system 300 even though the robot 100 moves in the training space A with nothing.

As illustrated, the controller 20 is formed with two displays.

The displays may include a first display B through which the trainee is capable of checking the driving of the robot 100 in the MR environment according to the scenario, and a second display which displays a current stage of the robot 100 in the entire stages of the scenario.

State data representing a speed, a coordinate value, and damage information of the robot 100 may be displayed in the first display B.

First, the MR environment implementing module 310 implements the virtual training event F and the virtual target objects G1 and G2 in the image through the image photographed by the robot 100 and the information about the training space A in the form of the MR environment, and displays the virtual training event F and the virtual target objects G1 and G2 in real time in response to the image in which the robot 100 moves and a direction of the robot 100 is changed.

Herein, the MR environment implementing module 310 may dispose the virtual training event F and the virtual target objects G1 and G2 together with the scenario module 320.

The interaction module 330 determines a position of the disaster task E in the scenario and generates a control command 331 capable of controlling the robot 100 at a contact point.

In particular, the interaction module 330 may include the interaction determining unit 332 which determines whether the disaster task E is the actual training event E existing in the training space A or the virtual training event F generated by the MR environment implementing module 310, and the kind of disaster task E, and generates the information about the disaster task E including the position of the disaster task E in the scenario.

The interaction module 330 may include the interaction control unit 334 which provides the robot 100 with the information about the disaster task E for the virtual training event F adjacent to the robot 100, generates the control command 331 controlling the robot 100 when the robot 100 is adjacent to the disaster task E, and provides the robot driving module 340 with the generated control command 331.

The interaction determining unit 332 may generate a size of the virtual training event F in the scenario in a plurality of coordinate data according to the information about the disaster task E and measure a distance between the robot 100 and the virtual training event F, and the interaction control unit 334 may provide the robot driving module 340 with the control command 331 at the contact point at which the robot 100 is in contact with the virtual training event F and the robot driving module 340 may provide the robot 100 with the control command 331.

The control command 331 may include coordinate data for a virtual volume of the disaster task E according to the information about the disaster task E.

Subsequently, in order to provide the control command to the robot driving module 340, the interaction control unit 334 may determine a distance between the robot 100 and the virtual training event F based on a predetermined threshold value, and provide the control command 331 in the threshold value in which the robot 100 is close to the contact point.

In this case, the trainee continuously transmits the control command 342, but the robot driving module 340 preferentially provides the robot 100 with the control command 331 at the contact point.

The interaction module 330 may include the interaction effect unit 336 which provides the control module 350 with the effect that the trainee may visually check the contact of the robot 100 with the virtual training event F according to the reception of the control command 331 by the robot 100.

When the robot 100 sequentially receives the operation command 342 in the state of receiving the control command 331, the interaction effect unit 336 may transmit the visual effect that the robot 100 collides with the virtual training event F to the MR environment implementing module 310 to generate an effect image, and provide the control module 350 with the effect image.

The effect image may be the effect in which the virtual training event F is transformed according to the speed of the robot 100 and the number of times of the contact or collision of the robot 100 with the virtual training event F by analyzing the operation command 342.

This will be described based on an example.

It is assumed that the robot 100 is in contact with the virtual training event F several times due to the control error of the trainee.

The interaction determining unit 332 first generates information about an disaster task E of the virtual training event F, and when the interaction control unit 334 determines that the roto 100 is close to the disaster task E and the position of the robot 100 is a threshold value, the interaction determining unit 332 provides the robot driving module 340 with the control command 331. Then, the robot driving module 340 provides the robot 100 with the operation command 342 and drives the robot 100, and when the robot driving module 340 receives the control command 331, the robot driving module 340 provides the robot 100 with the control command 331 when the robot 100 is located at the contact point, and provides the robot 100 with the operation command 332 again when the robot 100 gets out of the contact point.

The control command 331 makes the robot 100 recognize the virtual training event F. Accordingly, when the robot 100 receives the control command 331, the operation command 342 is not received, so that the trainee may experience as if the robot 100 collides with the wall.

Because the interaction effect unit 336 is connected with the MR environment implementing module 310, the interaction effect unit 336 visually implements the collision of the robot 100 with the virtual wall.

In order to visually express the collision of the robot 100 with the virtual training event F at the contact point through the control command 331, the interaction effect unit 336 may provide the control module 350 with the effect image in which the degree of damage to the disaster task E is divided according to the speed and the number of times of the collision of the robot 100.

The interaction effect unit 336 may receive travelling information through various sensors mounted to the robot 100, and determine the operation command 342 driving the robot 100 and visually express the traveling state of the robot 100.

The interaction effect unit 336 may receive the operation command 342 through the robot driving module 340, extract the travelling information through the sensor of the robot 100, and express rapid acceleration, rapid rotation, and a reaction at the contact point of the robot like a real.

For example, when it is assumed that the robot 100 is in a location with oil in the scenario, the robot 100 receives the operation command 342 and moves forward, but the interaction effect unit 336 may express that the number of times of the relative rotation of the wheels of the robot 100 increases through the virtual object of oil.

The interaction effect unit 336 recognizes a relationship between the virtual training event and the robot through the MR environment implementing module 310, generates data of an expectable reaction of the robot in the virtual training event F and an environmental disaster task (not illustrated), and implements a prestored MR environment when the robot is at a corresponding position.

The present exemplary embodiment has been described based on oil as the example, but wind and the transformation of the environmental form of a floor may be applied, and in various exemplary embodiment, the MR environment implementing module 310 may transform the shapes of the robot and the virtual training event according to the virtual training event and provides the control module 350 with the robot and the virtual training event.

In the meantime, FIG. 5 illustrates a signal flow when the robot 100 is in contact with the disaster task E.

When the trainee first operates the robot 100 in the situation where the robot 100 starts from the start position P1, the robot driving module 340 provides the robot 100 with the operation command 342 and an image of the robot 100 is transmitted to the system 300.

In the system 300, the MR environment implementing module 310 provides the display with an MR environment in response to the image, and the trainee moves the robot 100 to a target position while continuously operating the robot 100.

When the robot 100 meets the virtual training event F while moving, the interaction determining unit 332 may generate information about the disaster task E and provide the interaction control unit 334 with the generated information about the disaster task E, and the interaction control unit 334 may generate the control command 331 and provide the robot driving module 340 with the generated control command 331 and notify the interaction effect unit 336 of the contact or collision of the robot 100 at the contact point. Further, the robot driving module 340 provides a result of the response to the virtual training event F by the robot 100 to the MR environment through the control module 350. When the robot 100 passes through the virtual training event F, the trainee continuously operates the robot 100 to move the robot 100.

The robot driving module 340 simultaneously receives the operation command 342 of the trainee and the control command 331 of the interaction control unit 334, and provides the robot 100 with the control command 331 when the robot 100 is located up to a position having the threshold value or more of the contact point to make the robot 100 mistaken to recognize the virtual training event F.

In this case, the control command 331 is prioritized over the control command 342, so that the control command 331 generates the signal of the virtual training event F.

Continuously, when the operation command 342 is generated to drive the robot 100, the control command 331 blocks the robot 100 from moving to the position corresponding to the size of the disaster task E through the information about the virtual training event E, so that the trainee operating the robot 100 feels as if the robot 100 actually collides with the wall.

Then, since the interaction effect unit 336 is connected with the interaction control unit 334, when the control command 331 is generated, the interaction effect unit 336 determines the speed and the number of times of the collision of the robot 100 and provides the control module 350 with an image showing the damage of the virtual training event F together with the determined speed and number of times of the collision, so that the trainee may visually check that the disaster task E is damaged in response to the collision.

In the situation where the virtual training event F is adjacent to the robot 100, the interaction module 330 operates as illustrated in FIG. 6.

The robot 100 receives the operation command 342 and is driven through the operation command 342 (S01), the interaction determining unit 332 generates information on the disaster task E and determines whether the control command 342 makes the robot arrive at the contact point (S02), and determines whether the robot 100 arrives at the contact point and is in contact with the virtual training event F (S03).

Then, when the robot 100 arrives at the contact point and is not in contact with the virtual training event F, the robot driving module 340 provides the robot 100 with the operation command 342, and when the robot 100 is in contact with the virtual training event F, the robot driving module 340 provides the robot 100 with the control command 331 (S04), and the robot continuously receives the operation command 342 in the state of receiving the control command 331, so that an effect that the robot 100 collides with the virtual training event F or the virtual wall F is provided to the trainee (S05), and the control module 350 displays the effect on the display (S06).

The situation where the control command 331 makes the robot 100 be in contact with the virtual training event F is illustrated in FIGS. 7 and 8.

In the training space A, there is no virtual training event F, so that a user may make the robot pass through the virtual training event F due to an operation mistake of the user.

However, the control command 331 controls driving force of the robot 100 so that the virtual training event F may be in contact with the robot 100 to prevent the robot 100 from passing through the virtual training event F.

The interaction determining unit 332 generates the information about the disaster task E in coordinate data, so that the control command 331 controls the driving of the robot 100 in response to the size and the shape of the virtual training event F.

The object of the present invention is to increase an element of training of the trainee according to the recognition of the virtual training event F by the robot 100.

As illustrated in FIG. 9, when an actual disaster task R is disposed in the training space A, the robot 100 may be in contact with the actual disaster task R according to the operation command 342, so that this may be an item of the training, but the disaster task E similar to the actual situation is difficult to implement because it incurs a lot of cost, and the number of disaster tasks is limited, so that the item of the training is inevitably reduced.

However, when the robot 100 recognizes the virtual training event F through the intervention of the system 300, the trainee variously implement the virtual training event F and variously dispose the item of the training in the scenario. Accordingly, the items of the training are increased and an evaluation item may be evaluated in accordance with the item of the training.

In the foregoing, the exemplary embodiment according to the present invention has been described, and in addition to the above-described exemplary embodiment, the fact that the present invention can be embodied in other specific forms without departing from the spirit or the scope of the present invention is apparent to those skilled in the art. Accordingly, the foregoing exemplary embodiment is to be regarded as illustrative, rather than restrictive, and accordingly, the present invention is not limited to the above description and may be changed within the scope of the appended claims and their equivalents.

What is claimed is:

1. An interaction training system of a robot with a Mixed Reality (MR) environment, in which a trainee is trained to respond to a disaster task by operating a robot in a situation where a disaster occurs, the interaction training system comprising:
   a scenario module which establishes a scenario so that the trainee sets an environmental element incurable during the performance of the disaster task as a training event by operating the robot by the robot, and performs the disaster task by driving the robot and is trained in response to the training event;
   an MR environment implementing module which virtually or actually implements the disaster task in the scenario;
   an interaction module which determines whether the training event in the scenario is actual or virtual, and restricts the driving of the robot by the virtual training event before a command operating the robot by the trainee when the virtual training event is generated while the trainee operates the robot in order to perform the disaster task to make the trainee recognize the virtual training event;
   a robot driving module which priorities a command restricting the driving of the robot over the command operating the robot by the trainee and transmits the command restricting the driving of the robot to the robot when the driving of the robot is restricted by the interaction module; and
   a control module which provides the trainee with a result of the driving of the robot by the command of the trainee during the performance of the disaster task and a result of the driving of the robot restricted by the interaction module,
   wherein the interaction module provides the control module with a change of the robot and a change of the virtual training event for the result of the driving of the robot restricted in the virtual training event.

2. The interaction training system of claim 1, wherein the interaction module includes:
   an interaction determination unit which determines whether the training event in the scenario is an actual training event or a virtual training event, and determines whether the result obtained by commanding and driving the robot by the trainee matches the result obtained by commanding the robot so as to respond to the virtual training event when the training event in the scenario is the virtual training event;
   an interaction control unit which receives the result of the determination from the interaction determination unit, and provides the robot driving module with the command restricting the driving of the robot when the trainee fails to operate the robot to respond to the virtual training event; and
   an interaction effect unit which provides the control module with a state of the robot of which the driving is restricted by the virtual training event through the interaction control unit and a signal stimulating a sense of the trainee, and makes the trainee recognize the change of the robot and the change of the virtual training event for the result of the restriction of the driving of the robot.

3. The interaction training system of claim 2, wherein when the interaction determining unit of the interaction module determines that the training event is the actual training event, the interaction control unit does not involve the driving of the robot.

4. The interaction training system of claim 2, wherein the interaction control unit extracts the training event information from the scenario module and generates a control command that is a command for restricting the driving of the robot in response to a size and a position of the virtual training event.

5. The interaction training system of claim 2, wherein the interaction effect unit analyzes the command operating the robot by the trainee, and expresses a transformed state of the robot and a transformed state of the virtual training event in the MR environment according to a speed of the root and the number of times of a contact and a collision of the robot with the virtual training event.

6. The interaction training system of claim 4, wherein the robot includes a robot action unit which physically changes a state of the robot so as for the trainee to recognize a result corresponding to the virtual training event.

7. The interaction training system of claim 6, wherein the robot is coupled with wheels and is movably provided, and
the robot action unit is mounted to the wheel of the robot and blocks driving force rotating the wheels by the control command.

8. The interaction training system of claim 1, further comprising:
a training evaluation module which evaluates a result of the operation of the robot obtained while the trainee responds to the disaster task and the training event by driving the robot.

9. The interaction training system of claim 8, wherein the training evaluation module compares travelling information of the robot, position information of the robot, and time information on time at which the robot passes through the scenario in the scenario with prestored scenario success data and draws a result.

* * * * *